(12) United States Patent
Sakai

(10) Patent No.: US 7,131,654 B2
(45) Date of Patent: *Nov. 7, 2006

(54) VEHICLE SUSPENSION SYSTEM

(75) Inventor: Kouji Sakai, Shizuoka (JP)

(73) Assignee: Yamaha Hatsuboki Kabushiki Kaisha, Shizuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/979,511

(22) Filed: Nov. 2, 2004

(65) Prior Publication Data

US 2005/0087411 A1 Apr. 28, 2005

Related U.S. Application Data

(62) Division of application No. 09/759,294, filed on Jan. 11, 2001, now Pat. No. 6,811,171.

(30) Foreign Application Priority Data

Jan. 11, 2000 (JP) .............................. 2000-002597

(51) Int. Cl.
*B60G 9/04* (2006.01)

(52) U.S. Cl. .................................. 280/159; 267/64.16

(58) Field of Classification Search ................ 280/159, 280/124.06, 124.159, 124.16, 124.157, 124.158; 267/64.16, 64.17, 64.11, 64.25

See application file for complete search history.

(56) References Cited

U.S. PATENT DOCUMENTS

| | | | |
|---|---|---|---|
| 2,184,202 A | 12/1939 | Tschanz | |
| 3,024,037 A | 3/1962 | Fiala | |
| 3,032,349 A | 5/1962 | Fiala | |
| 3,736,000 A | 5/1973 | Capgras | |
| 3,752,497 A | 8/1973 | Enke et al. | |
| 4,251,088 A | 2/1981 | Shyu | |
| 4,295,660 A | 10/1981 | Toti et al. | |
| 4,371,182 A | 2/1983 | Brown | |
| 5,020,826 A | 6/1991 | Stecklein et al. | |
| 5,040,823 A | 8/1991 | Lund | |
| 5,486,018 A | 1/1996 | Sakai | |
| 5,562,305 A | 10/1996 | Heyring | |
| 5,584,498 A | 12/1996 | Danek | |
| 5,984,059 A | 11/1999 | Kurachi et al. | |
| 6,010,139 A | 1/2000 | Heyring et al. | |
| 6,024,366 A | 2/2000 | Masamura | |
| 6,250,658 B1 | 6/2001 | Sakai | |
| 6,511,085 B1 | 1/2003 | Sawai | |
| 6,556,907 B1 | 4/2003 | Sakai | |
| 6,811,171 B1 | 11/2004 | Sakai | |

*Primary Examiner*—Xuan Lan Nguyen
(74) *Attorney, Agent, or Firm*—Knobbe, Martens, Olson & Bear, LLP

(57) ABSTRACT

A vehicle is carried by a number of supporting members, such as wheels. Movement between the supporting members and the vehicle body is controlled by respective dampers. Several interrelationships between and among the dampers are disclosed. A flow regulator is provided to augment damping forces under a variety of operating conditions.

26 Claims, 11 Drawing Sheets

VEHICLE SUSPENSION SYSTEM

RELATED APPLICATIONS

This application is a divisional of U.S. patent application Ser. No. 09/759,294, filed Jan. 11, 2001 now U.S. Pat. No. 6,811,171, which is based on and claims priority to Japanese Patent Application No. 2000-002597, filed Jan. 11, 2000, the entire contents of both of which are hereby incorporated by reference.

BACKGROUND OF THE INVENTION

1. Field of the Invention

The present invention generally relates to vehicle suspension systems. More particularly, the present invention relates to interrelated multiwheel suspension systems that provide improved damping when a vehicle rolls or pitches and a single wheel encounters a bump.

2. Description of Related Art

Vehicles often comprise suspension systems that smooth operation over uneven or rough terrain. The suspension systems often involve placing a damper between the vehicle and the surface contacting member, such as a wheel. An example of a suspension system used in four-wheel vehicles has been disclosed in Japanese laid open patent application No. HEI-6-62127. Reproduced as FIGS. 1–3 in the present application are figures that disclose a construction similar to that disclosed in that laid open application.

With reference now to FIGS. 1–3, three alternative constructions of a suspension system will be described. The suspension system, indicated generally by the reference numeral 20, comprises a front left damper 22, a front right damper 24, a rear left damper 26, and a rear right damper 28. In the illustrated arrangement, each of the dampers is constructed identical to the others. In particular, in the illustrated arrangement, an outer cylinder 30 is divided into an upper chamber 32 and a lower chamber 34 by a piston 36. The piston 36 is slidably mounted within the inner bore of the outer cylinder 30. In addition, the piston comprises at least one passage 38 which extends through the body of the piston 36 to place the upper chamber 32 and the lower chamber 34 in fluid communication with each other. A throttle 40 preferably is disposed within the passage 38 to control the flow rate through the passage 38 of fluid from the upper chamber 32 to the lower chamber 34, and vice versa. Of course, more than one passage can be used and such passages can be configured with valves that limit flow to one direction. Such a configuration allows varying damping rates between the two different directions of piston movement. In the illustrated arrangement, the piston 36 is mounted to a piston rod 42. One of the piston rods 42 and the cylinder 30 is connected to the vehicle body while the other of the two members is connected to the wheel. In this manner, movement between the wheel and the vehicle body can be controllably damped by movement of the piston 36 within the bore of the outer cylinder 30.

With continued reference to FIGS. 1–3, each of the cylinders 22, 24, 26, 28 is directly interconnected through the use of a pressure regulator 44. FIGS. 1–3 illustrate four different arrangements of the pressure regulator 44 and the interconnection between the cylinders 22, 24, 26, 28. Depending upon the interconnection used, the suspension systems 20 exhibit varying response characteristics to movement of the vehicle.

With reference now to FIG. 1, the illustrated pressure regulator 44 generally comprises a pair of parallel lower chambers 46, 48. The first lower chamber 46 is defined within a first cylinder 50, while the second lower chamber 48 is defined within a second cylinder 52. A first piston 54 subdivides a portion of the first cylinder 50 into the first lower chamber 46 while a second piston 56 subdivides a portion of the chamber or the cylinder 52 into the second lower chamber 48. The pistons 54, 56 are connected together with the use of a single connecting rod 58 that ties the pistons 54, 56 together for movement. In other words, the connecting rod 58 ensures that the pistons 54, 56 travel together. In the illustrated arrangement, the connecting rod 58 is disposed within a chamber 60 that is defined within the pressure regulator 44. The chamber 60 preferably is filled with an inert gas. The inert gas exerts a pressure against the pistons 54, 56 to drive the pistons into a desired equilibrium position. A passage 62 containing a throttle valve extends between the first lower chamber and the second lower chamber 48. The passage 62 contains the throttle to allow damping to occur when fluid flows from one chamber to the other chamber.

The pressure regulator illustrated in FIG. 2 has a construction similar to that illustrated in FIG. 1. However, the pressure regulator 44 illustrated in FIG. 3 contains two additional chambers 64, 66 that are interconnected in parallel by two additional throttled passages 68, 70. The chambers 64, 66 are also defined, in part, by a pair of pistons 72, 74 that are interconnected with the connecting rod 68.

Functionally, the suspension systems 20 illustrated in FIGS. 1–3. operate differently depending upon the loads and relative movements of the vehicle. For instance, in the arrangement illustrated in FIG. 1, both of the dampers 22, 26 on the left side of the vehicle are interconnected to a single chamber of the pressure regulator 44 while both of the dampers 24, 28 on the right side of the vehicle are connected to a second chamber of the pressure regulator 44. Such a construction results in flow through the throttled passage 62 that extends between the chambers 46, 48 when the vehicle rolls or otherwise sways laterally. Such flow results from the differing movements of the dampers on the left side of the vehicle and the dampers on the right side of the vehicle. As working oil flows through the throttle passage 62, the movement of the pistons is further damped by the restriction of the throttled passage. The arrangement illustrated in FIG. 1, however, results in little flow between the two chambers through the throttle passage 62 when the vehicle pitches, such as during rapid acceleration or deceleration.

With reference now to the arrangement illustrated in FIG. 2, the dampers 22, 28 and the dampers 24, 26 are interrelated and are connected to the chambers 46, 48, respectively. In other words, the vehicle supported by the suspension system 20 illustrated in FIG. 2 features cross-related dampers (i.e., left front damper 22 and right rear damper 28 are connected to a single chamber while the right front damper 24 and the left rear damper 26 are connected to a second chamber). This cross-arrangement results in increased damping forces caused by flow through the throttle passage 62 when the vehicle is twisted such as occurs when accelerating or decelerating into a corner or out of a corner. In other words, when the pressure is increased at one corner of the vehicle relative to the other three corners, increased damping results from flow between one of the chambers 46, 48 into the other of the chambers 46, 48 of the pressure regulator 44.

With reference now to FIG. 3, each of the dampers 22, 24, 26, 28 is connected to its own chamber 46, 64, 66, 48, respectively. The adjacent chambers such as 46, 64, or 64, 66 or 66, 48 are directly interconnected by throttle passages. In this manner, when the vehicle rolls (i.e., rotates about a longitudinally extending axis) differential pressures result within the two chambers associated with the left side of the vehicle as compared to the two chambers associated with the right side of the vehicle. Accordingly, working oil flows through three throttle passages (68, 70, 62) to equalize the differentials in the oil pressure. Thus, the pressure regulator 44 provides increased damping force during rolling movement of the vehicle body. In addition, with the suspension system 20 illustrated in FIG. 3, when the vehicle body pitches (i.e., rotates about a transversely extending axis) working oil passes between the chambers 46, 64 and 66, 48 through the throttle passages 68 and 62. This results in the pressure regulator 44 increasing the available damping forces during pitching of the vehicle.

It has been found, however, that each of the above-described arrangements suffers from a similar problem. In particular, when the paired dampers move in the same direction and one of the wheels associated with one of the dampers suddenly negotiates a bump in the road, the desired damping forces that resist rolling and pitching can be reduced. For example, in the arrangement illustrated in FIG. 1, if the dampers 22 and 26 are extending, whereby the volume of the lower chambers 34 is increasing, while the dampers 24, 28 are contracting, whereby the volume in the lower chambers 34 is decreasing, such that the working oil is flowing from right to left through the throttled passage 62, the flow rate through the throttle passage 62 will undesirably decrease should one of the dampers 22, 26 suddenly contract or should one of the dampers 24, 28 suddenly extend. The sudden extension or contraction, such as that encountered during operation over a bump or through a rut, therefore, will rapidly decrease the damping force available for restricting rolling. A similar result would arise in the arrangements illustrated in FIGS. 2 and 3 as well.

Accordingly, a suspension system is desired in which the damping force during pitching or rolling of the vehicle body is substantially uneffected by irregularities in the road surface.

SUMMARY OF THE INVENTION

Accordingly, one aspect of the present invention involves a suspension system for a four wheeled vehicle. The suspension system comprises a first damper, a second damper, a third damper and a fourth damper, with each of the dampers comprising a cylinder body and a piston arranged to reciprocate within the damper. Each piston divides an interior of each cylinder body into an upper chamber and a lower chamber and each piston also comprises a connecting passage that places the upper chamber and the lower chamber in fluid communication. The lower chamber of the first damper and the lower chamber of the second damper are interconnected with a pressure regulator. The pressure regulator comprises a first pressure regulating chamber and a second pressure regulating chamber. A first moveable wall defines at least a portion of the first pressure regulating chamber and a second moveable wall defines at least a portion of the second pressure regulating chamber. The lower chamber of the first damper being connected to the first pressure regulating chamber and the lower chamber of the second damper being connected to the second pressure regulating chamber. A passage extends between the first pressure regulating chamber and the second pressure regulating chamber. The pressure regulator further comprises a third pressure regulating chamber. The third pressure regulating chamber is connected with the third damper and the fourth damper through at least a first conduit. A flow regulator is disposed along the first conduit and is in fluid communication with the first conduit. The flow regulator contains a first flow regulating chamber and a second flow regulating chamber with the first flow regulating chamber and the first conduit communicating through a throttled passage.

Another aspect of the present invention involves a suspension system comprising a first damper, a second damper, a third damper and a fourth damper. The first damper and the second damper forms a first damper pair and the third damper and the fourth damper forms a second damper pair. The first damper pair and the second damper pair are fluidly connected through means for regulating flow into and out of the first damper pair and the second damper pair.

A further aspect of the present invention involves a suspension system comprising a first movement restricting portion and a second movement restricting portion. The first movement restricting portion and the second movement restricting portion are interconnected by a fluid passage. A flow regulator is in fluid communication with the fluid passage and the flow regulator has a fluid chamber and a moveable wall.

BRIEF DESCRIPTION OF THE DRAWINGS

These and other features, aspects, and advantages of the present invention will now be described with reference to the drawings of several preferred embodiments, which embodiments are intended to illustrate and not to limit the present invention. The drawings comprise 12 figures, three of which have already been described.

DETAILED DESCRIPTION OF THE PREFERRED EMBODIMENT

While the present invention will be described in a context of a four-wheel vehicle, the present suspension system can be used with other types of vehicles. For instance, the present suspension system can be used with vehicles having a track, skis, fewer than four wheels or more than four wheels, and other vehicles that will be appreciated by those of ordinary skill in the art. Accordingly, the suspension system will be described generally with reference to four supporting members, such as wheels, and a chassis or frame to which the dampers of the illustrated suspension system can be attached.

Figure 1:
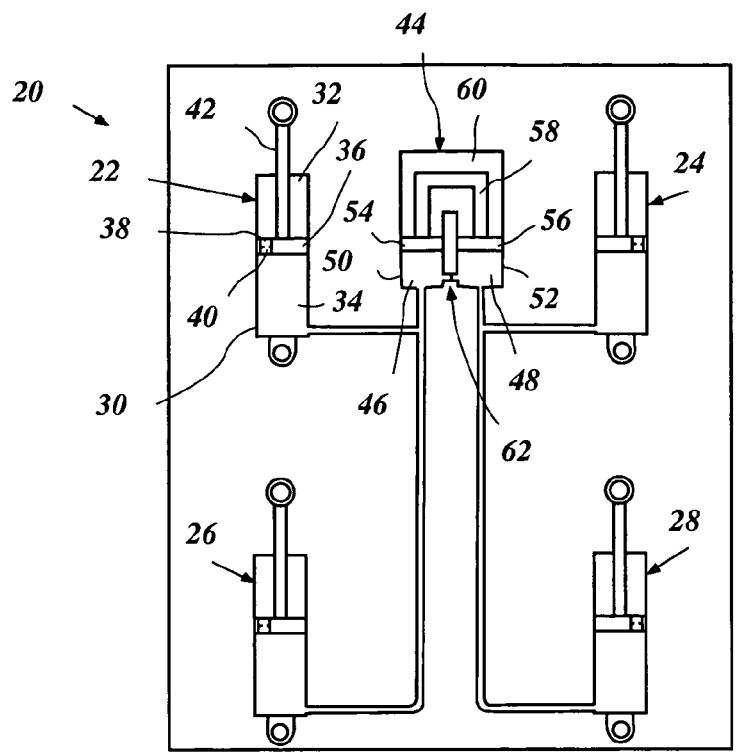
FIGS. 1–3 are arrangements similar to those disclosed in laid open Japanese Patent Application No. HEI6-72127.
Figure 2:
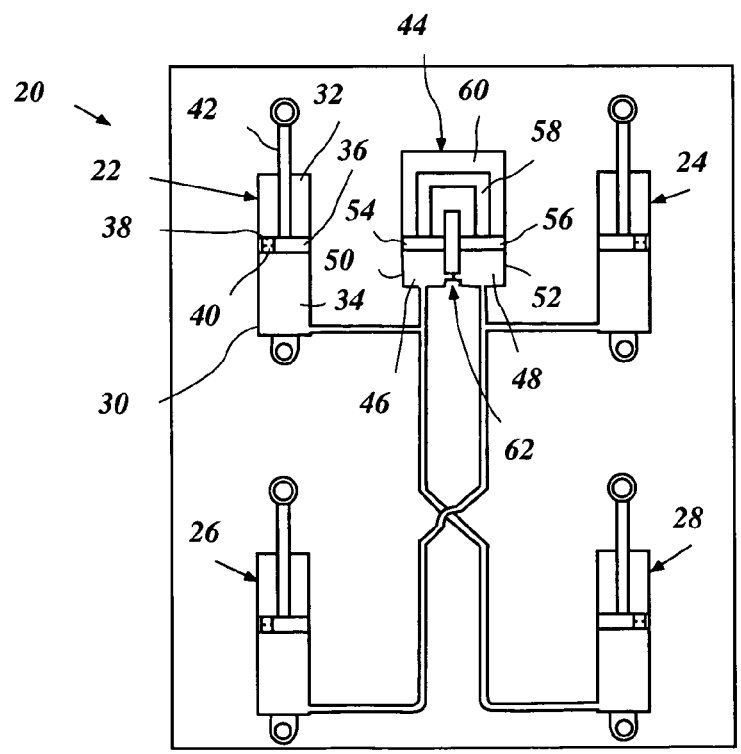
Figure 3:
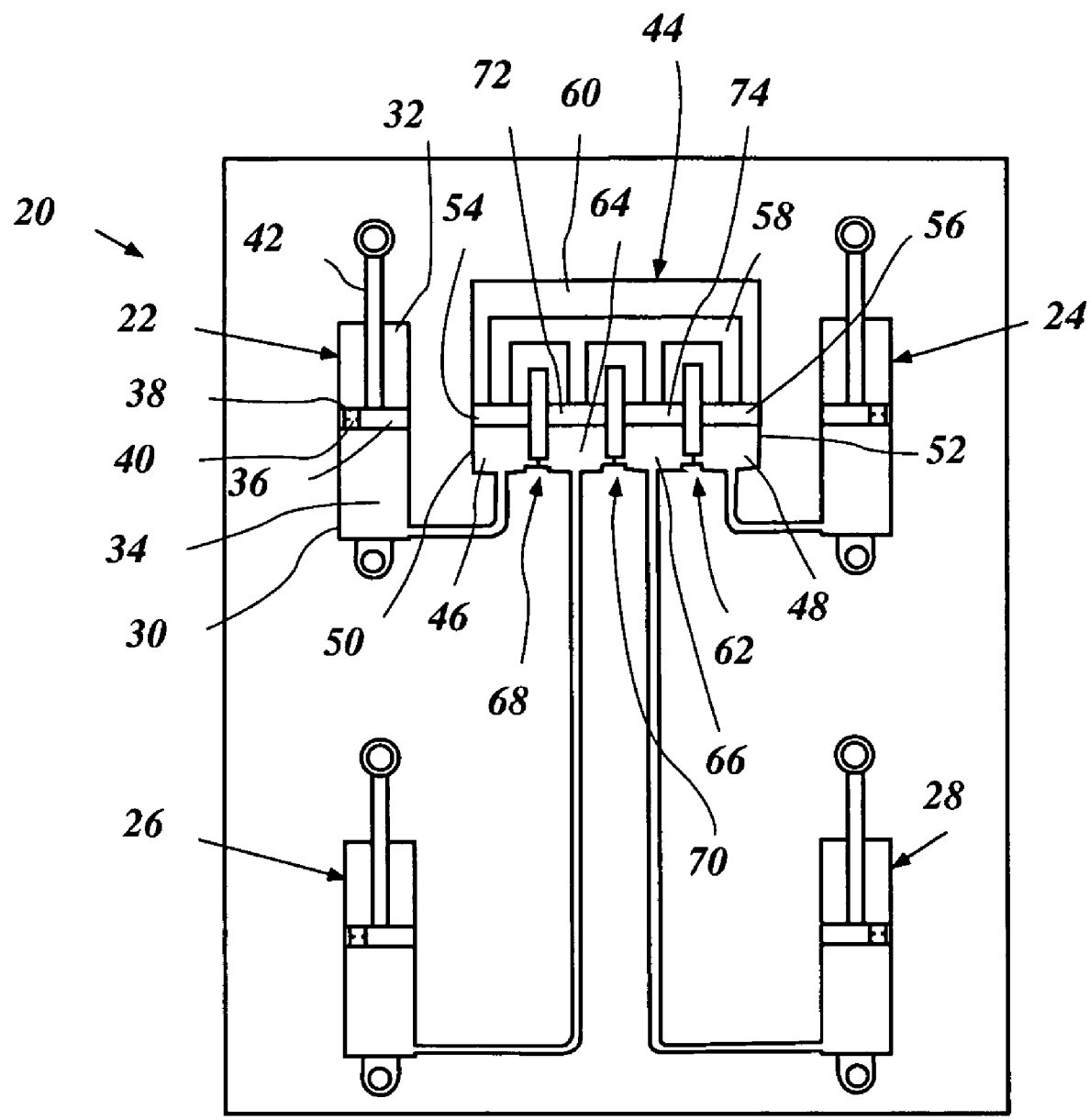
Figure 4:
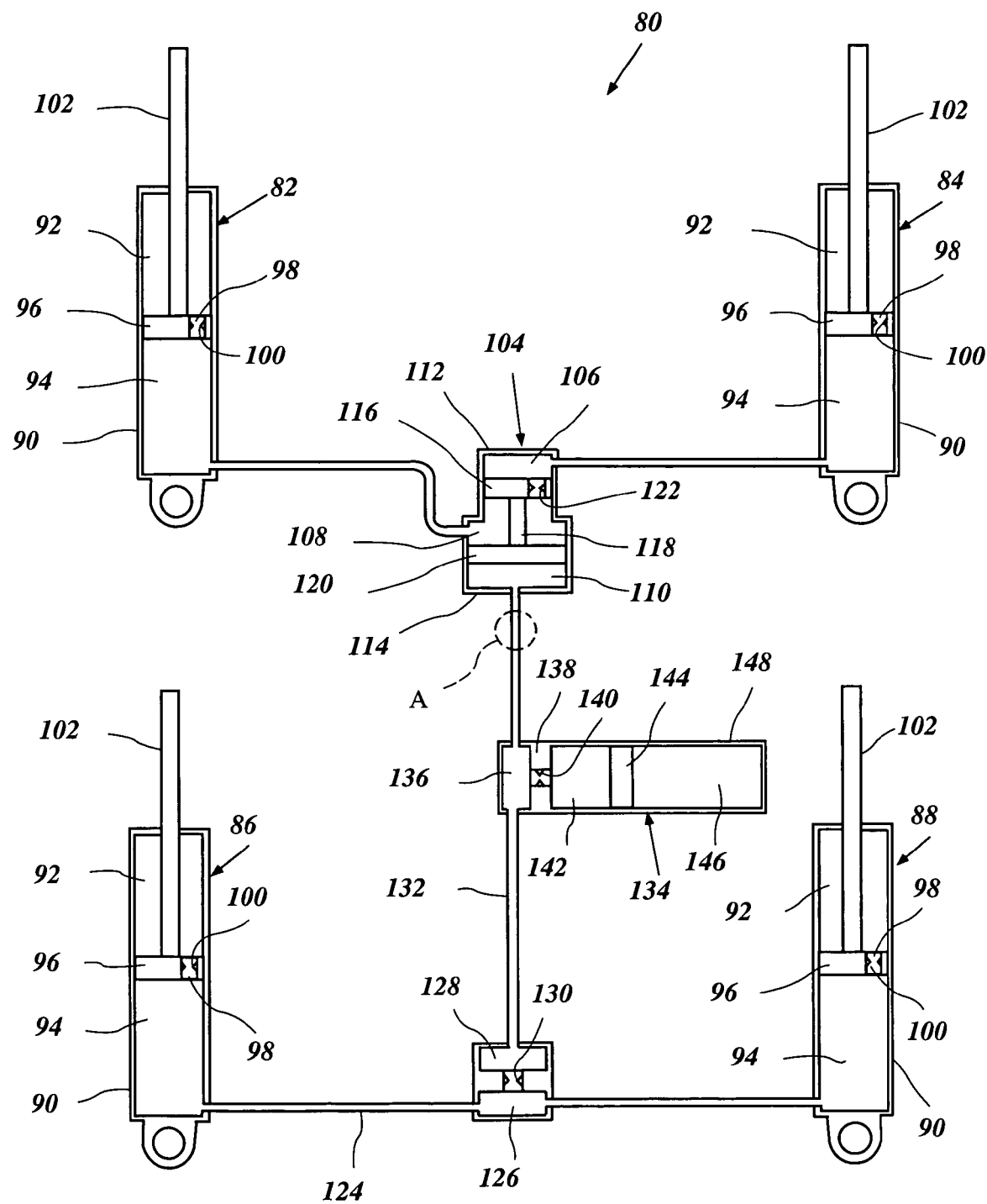
FIG. 4 is an arrangement of a suspension system configured and arranged in accordance with certain features, aspects, and advantages of the present invention.

With reference now to FIG. 4, a first arrangement of a suspension system, which is indicated by the reference numeral 80, will be described in greater detail. Similar to the arrangement described above, the illustrated suspension system 80 comprises a front, left damper 82, a front, right damper 84, a rear, left damper 86 and a rear, right damper 88. As described above, the illustrated arrangement may comprise more or less dampers, depending on the number of components that are to be damped through the illustrated suspension system. In addition, in the illustrated arrangements, each of the dampers 82, 84, 86, 88 are identically constructed but need not be. In other words, some of the dampers may have a different construction as compared to the other dampers in the system. However, because the present invention generally relates to interrelating multiple dampers, the particular construction of each of the dampers is not critically important and any of a number of damper constructions would be suitable.

Each of the illustrated dampers generally comprises an outer cylinder 90 that defines within it an inner cylinder bore. The inner cylinder bore in the illustrated arrangement is subdivided into an upper chamber 92 and a lower chamber 94 by a piston 96. The piston 96 generally comprises at least one through passage 98 that contains a throttle valve 100. The through passage 98 places the upper chamber 92 and the lower chamber 94 in fluid communication. The throttle valve 100 controls the flow rate between the two chambers 92, 94 during movement of the piston 96 within the bore of the outer cylinder 90. Of course, the piston 96 may contain more than one aperture and flow between the two chambers can occur at differing flow rates by closing off one aperture or another in manners well known to those of ordinary skill in the art. Of course, those of ordinary skill in the art will also recognize that the terms upper and lower in the illustrated arrangement are merely relative. These terms should not form limitations on the present invention because the upper chamber can be a lower chamber and the lower chamber can be an upper chamber. In addition, in some arrangements, the cylinders 90 may be inclined substantially rather than being substantially vertical in orientation.

With continued reference to FIG. 4, the piston 96 is mounted to a piston rod 102. The piston rod 102 and the outer cylinder 90 are mounted to the vehicle body while the other member is mounted to the sprung wheel or other supporting member. Preferably, in the illustrated arrangement, the piston rods 102 are connected to the vehicle body while the outer cylinders 90 are connected to the wheels or other supporting members. Of course, it is envisioned that the piston rods 102 can be connected to the supporting members such as the wheels, while the outer cylinders 90 can be connected to the vehicle body. Of course, the mounting arrangement can vary from damper to damper if desired.

With continued reference to FIG. 4, the front, left damper 82 and the front, right damper 84 are interconnected through the use of a pressure regulator 104. In the illustrated arrangement, the pressure regulator comprises a first chamber 106, a second chamber 108, and a third chamber 110. In the illustrated arrangement, these three chambers 106, 108, 110 are disposed within a single body comprising a first cylinder 112 and a second cylinder 114. The sizing and arrangement of the components results in the first chamber 106 and the second chamber 108 having substantially equal effective volumes such that a volume change in one chamber 106 caused by displacement of the piston rod 102 causes an equal volume change in the other chamber 108 even though both pistons travel the same distance.

In the illustrated arrangement, the first chamber 106 is separated from the second chamber 108 by a first piston 116. The first piston 116 is connected by a connecting rod 118 to a second piston 120. The second piston 120 segregates the second chamber 108 from the third chamber 110. Notably, in the illustrated arrangement, the second chamber 108 is defined between two pistons that are fixed to one another for movement. The change in the cross-sectional area of the chamber allows the volume of the chamber to change during movement of the combined pistons 116, 120. In addition, a throttled opening 122 is disposed in the first piston 116 to allow fluid communication between the first chamber 106 and the second chamber 108. In this manner, changes in the pressure in the first damper 82 relative to the second damper 84 can be accommodated by flow through the throttle passage 122. The flow through the throttle passage 122 results in an increase in the damping effect associated with the front dampers 82, 84.

As illustrated in FIG. 4, the rear dampers 86, 88 are interconnected to a first passage or conduit 124. The conduit 124 extends between the lower chambers 94 of the left rear damper 86 and the right rear damper 88. In the illustrated arrangement, a small subchamber 126 is defined at a location in-between the two dampers 86, 88. The subchamber 126 is in fluid communication with a second subchamber 128 through a throttled passageway 130. The second subchamber 128 is in fluid communication with a second conduit or passage 132. The second passage 132 is in fluid communication with the pressure regulator 104 through a portion of a flow rate regulator 134 in the illustrated arrangement. In the illustrated arrangement, the second conduit 132 extends into a third subchamber 136 that is formed as a portion of the flow rate regulator 134. It is anticipated, however, that the flow rate regulator 134 can be connected to the suspension system 80 through a conduit rather than through the subchamber 136. It should also be noted that in the area circled with dashed lines and indicated by the reference letter A, an additional throttle valve could be disposed to provide further damping in manners that will be explained below.

The flow rate regulator of the illustrated arrangement comprises a neck down portion 138 through which a throttle passage 140 is disposed. The throttle passage 140 extends into a flow regulating chamber 142. The flow regulating chamber 142 is in fluid communication with the second conduit 132 in the illustrated arrangement. A movable partition or wall 144 is interposed between the flow regulating chamber 142 and a pressure chamber 146. The pressure chamber 146 and the flow regulating chamber 142 are disposed within a cylinder 148 that comprises an inner bore against which the movable wall 144 in the illustrated arrangement is in registry. The movable wall 144 can slide, similar to a piston, back and forth within the bore of the cylinder 148. Of course, in some arrangements, the movable wall can be fixed to the cylinder about its periphery with an inner flexible wall, such as a diaphragm.

With reference to the arrangement illustrated in FIG. 4, operation of the arrangement will be described in detail. First, when the vehicle rolls, such as going into a turn, damping is provided primarily by the throttle valves disposed within the dampers 82, 84, 86, 88, as well as the damper disposed within the pressure regulator 104. In particular, and for example, when the vehicle enters a right hand turn, such that the dampers 82, 86 that are disposed on the left side of the vehicle contract while the dampers 84, 88 on the right hand side of the vehicle extend, fluid is displaced between the upper chambers 92 and the lower chambers 94. This displaced fluid goes through the throttle valves 100 that are disposed within the passages in the pistons 96. Obviously, the piston rods 102 displace a portion of fluid from within the upper chamber 92. Accordingly, as the piston rod 102 moves in and out of the upper chamber 92, a portion of fluid must be contributed to or expelled from the lower chamber 94 to compensate for this volumetric change. This portion of fluid is either received by or provided by the first chamber 106 or the second chamber 108 depending upon the connections to the dampers.

In the illustrated arrangement, if the piston rod 102 is forced down into the damper 82 during a compression of the damper 82, a portion of the fluid is displaced into the second chamber 108 of the pressure regulator 104. Similarly, during a right hand turn as the piston rod 102 is extended in the damper 84, fluid must be added to the lower chamber 94 from the first chamber 106 of the pressure regulator 104. This exchange of fluid passes through the throttled passage 122 disposed within the piston 116. Thus, the throttle passage 122 provides a damping force together with the throttle passages 98 that are formed within the pistons 96 of the dampers 82, 84.

Similarly, with the rear wheels, the fluid can be directly exchanged along the first conduit or passage 124 through the first subchamber 126. For example, if the piston rods 102 of the front left damper 82 and the rear left damper 86 are extended by the same amount and the piston rods 102 of the front right damper 84 and the rear right damper 88 are contracted by the same amount, then there will be an equal exchange of fluid from the left side to the right side of the suspension system. In such a configuration, the volume within the third chamber 110 of the pressure regulator 104 does not change. Accordingly, the pistons 116, 120 and the connecting rod 118 remain motionless. Thus, the damping forces are provided by the throttle passages 98 formed within the pistons 96 of the front dampers 82, 84 and the throttled passage 122 formed within the pressure regulator 104. With respect to the rear wheels, the damping forces arise through the throttle passages 98 formed within the pistons 96.

The illustrated flow regulator 134 comes into play when one of the wheels enters a pothole or goes over a bump relative to the other of the wheels. For instance, if the left front wheel or other supporting member enters a recess on the road surface while the vehicle is negotiating a corner and the suspension system is operating in a roll resisting mode, the action within the front left damper 82 changes from compression to extension. Accordingly, the pressure in the second chamber 108 of the pressure regulator 104 suddenly decreases. Additionally, the pressure within the first chamber 106 of the pressure regulator 104 also tends to decrease with the decrease of pressure in the second chamber 108. Due to the decrease in pressure, the pistons 116, 120 and the connecting rod 118 tend to move upward due to the oil pressure in the first and second chambers 106, 108 decreasing. This decrease in pressure is relative to the rear portion of the suspension system 80. As the pistons 116, 120 move upward within the pressure regulator 104, the volume within the third chamber 110 increases. The increase in the volume of the third chamber 110 is compensated for by working oil that is drawn from the flow regulating chamber 142 through the connecting passage 140 into the subchamber 136 and eventually into the second passage 132. The flow through the throttled connecting passage 140 increases to compensate for the decreased damping effect of the flow through the throttled passage 122. It should be appreciated that a similar phenomenon also would occur when a hydraulic cylinder or damper on the right side of the vehicle changes from extension to contraction or contraction to extension during rolling resisting operation of the suspension system. Of course, in this situation, the pistons 116, 120 and the connecting rod 118 would move downward, displacing a portion of working fluid from the third chamber 110 of the pressure regulator 104 into the flow regulating chamber 142 of the flow regulator 134 through the throttled connecting passage 140. Thus, the throttled connecting passage 140 will still play a role in increasing damping force during this movement.

During a similar rolling resisting mode, when a rear wheel moves in a direction opposite that anticipated during the rolling resisting mode operation (i.e., during a right hand turn extending on the left damper 86) working oil flows from the passage 124 into the passage 132. At the same time because the pistons 116, 120 and the connecting rod 118 of the pressure regulator 104 are motionless due to an equalization of pressure within the front portion of the system, the displaced fluid flows into the flow regulating chamber 142 through the throttled passage 140. Thus, the throttled passages 130 and 140 increase the damping force. Of course, if a contracting damper 86 were suddenly extended such as when the wheel or supporting member encounters a recess or pothole, fluid would be supplied from the flow regulating chamber 142 into the passages 132, 124 to the respective damper 86, 88.

It should also be noted that when the vehicle pitches, that is when the front and the rear portions of the suspension system move in opposite directions, a similar effect can also be achieved through use of a flow regulator such as that described above. For instance, damping forces are produced by the throttles 100 disposed within the passages 98 of the pistons 96 and with the throttled passage 130 that is interposed between the first passage 124 and the second passage 132. In addition, when the front part and the rear part of the vehicle body move in the same direction or the vehicle bounces, damping forces are produced with the throttles 100 disposed within the passages 98 of the pistons 96, as well as with the throttled passage 130 interposed between the first passage 124 and the second passage 132. The high pressure gas contained within the chamber 146 of the flow rate regulator 134 acts as a spring force due to the movement of fluid within the system.

Positioning a throttle valve at the location identified by the dashed circle A in FIG. 4 serves to further increase the damping forces available within the suspension system. Preferably, this throttle valve would be positioned roughly in the middle of the second communication passage 132 between the pressure regulating oil chamber or the third chamber 110 of the pressure regulator 104 and the flow rate regulator 134. Providing this throttle valve would make it possible to further increase the damping force during both pitching and bouncing. Incidentally, the position of the flow rate regulator 134 is not limited to that disclosed in the embodiment illustrated in FIG. 4. For instance but without limitation, the flow rate regulator 134 can be connected to the middle of the first communication passage 124 similar to that where the first throttled passage 130 is located.

With continued reference to FIG. 4, the illustrated arrangement features a pair of dampers 82, 84 on the front wheel side that are respectively connected to a pressure regulator 104. It is envisioned, however, that the hydraulic cylinders or dampers 86, 88 for the rear wheels can be interconnected through a pressure regulator 104 with an arrangement similar to that shown connecting the rear dampers in the illustrated arrangement used to connect the front dampers in this alternative arrangement. In addition, such a construction would provide an extra damping force for a more heavily weighted front portion of the vehicle body. This extra damping force is provided by the throttled passage 130, which would then be positioned between the front dampers, and the second passage 132. Such a construction would reduce the likelihood that reduced or inadequate damping forces would be produced regardless of the spring weight on the front portion of the vehicle. In addition, although the throttled passage 130 can be omitted in some applications, providing the throttled passage 130 advantageously increases the damping forces when the hydraulic cylinders or dampers 86, 88 on the rear wheels work in the same direction. Thus, the illustrated arrangement advantageously increases the available damping forces even when a heavy object is loaded onto the rear wheels, such as when objects are placed within a truck bed positioned above the rear wheels.

Figure 5:
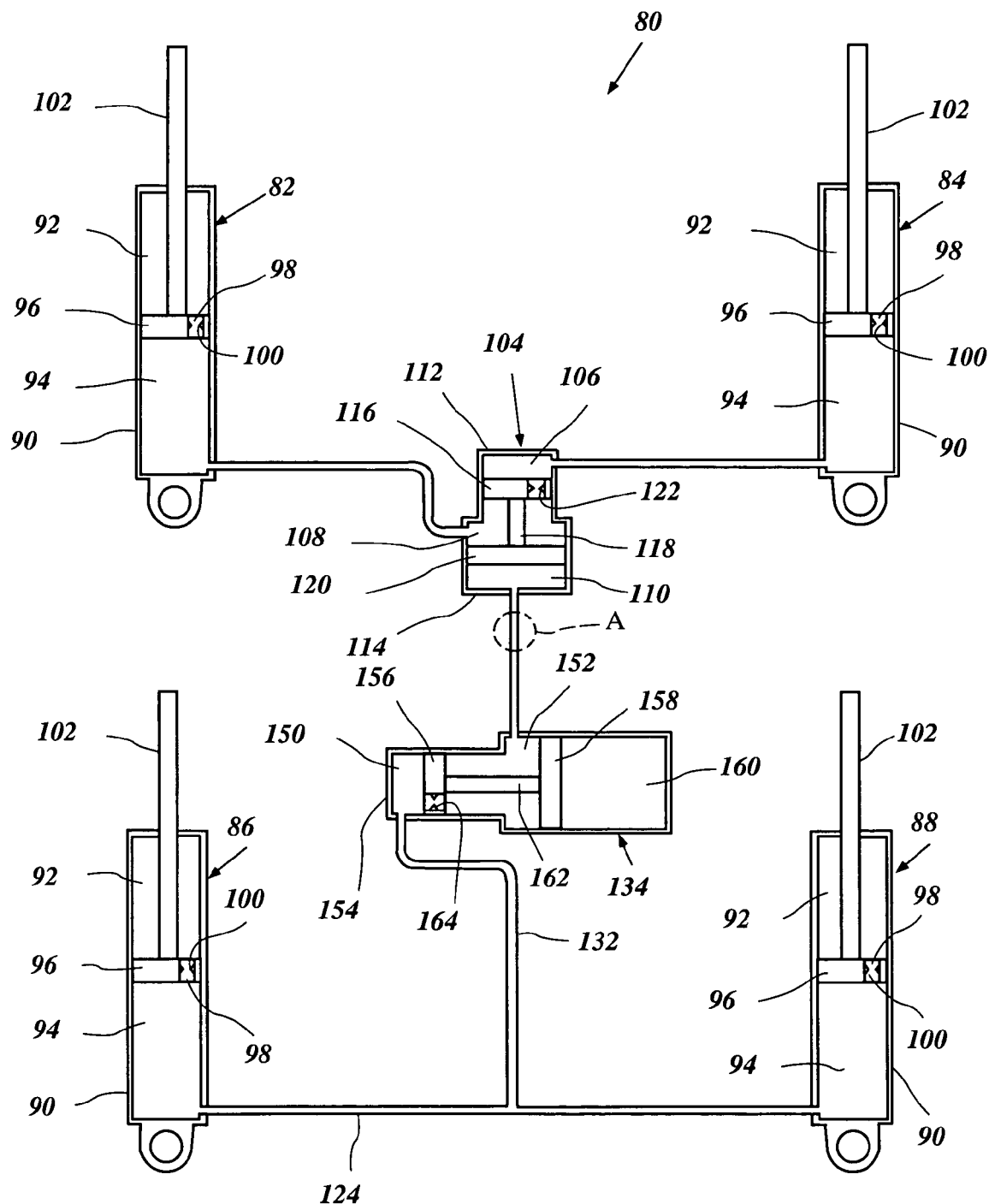
FIG. 5 is another arrangement of a suspension system arranged and configured in accordance with certain features, aspects, and advantages of the present invention.

With reference now to FIG. 5, a further suspension system arranged and configured in accordance with certain features, aspects and advantages of the present invention is illustrated therein. This arrangement is similarly constructed to that of FIG. 4 with a variation in the flow rate regulator 134. Accordingly, like reference numerals will refer to like elements and further description of those elements will not be made unless pertinent to the understanding and application of the arrangement illustrated in FIG. 5. In addition, the arrangement of FIG. 5 differs from the arrangement of FIG. 4 in that the rear dampers 86, 88 are directly connected to the flow rate regulator 134. That is to say, in the illustrated arrangement, throttle valves and subchambers preferably are not positioned between the flow rate regulator 134 and the dampers 86, 88.

With continued reference to FIG. 5, the flow rate regulator 134 generally comprises a first chamber 150 and a second chamber 152. The first and second chambers 150, 152 are contained within a cylinder body 154. Similar to the construction of the pressure regulator 104, the cylinder body 154 has a step configuration such that the first chamber 150 in the illustrated arrangement has a smaller diameter than the largest diameter portion of the second chamber 152. A first piston 156 segregates the first chamber from the second chamber and a second piston 158 segregates the second chamber 152 from a third chamber 160. The third chamber 160 generally is filled with inert gas that can be charged to a desired pressure. The gas-filled chamber 160 acts to urge the piston 158 toward a desired location. In addition, the first piston 156 is connected to the second piston 158 with a connecting member 162. The connecting member 162 is configured and arranged such that the first piston 156 and the second piston 158 translate within their relative bores of the cylinder body 154 as a single unit. It is anticipated that the first chamber and the second chamber 150, 152 could be configured in separate cylinders and connected through any sort of passage.

In the illustrated arrangement, the first chamber 150 and the second chamber 152 communicate through a throttled passage 164. The throttled passage 164 is defined within the piston 156. Desirably, the components are sized such that the volumetric change in one chamber 150 is the same as the volumetric change in the second chamber 152 for each amount of translation of the joint piston 156, 158. Of course, this relationship may vary depending upon the actual construction of the dampers 82, 84, 86. In the illustrated arrangement, it should be noted that the pistons 156, 158 are coaxially arranged with the connecting number extending along the axis of the two members. In addition, it should be noted that other dividing wall arrangements can be used. For instance, a diaphragm like wall in which the edges of the diaphragm are affixed to the cylinder bore and a portion of this diaphragm body moves to expand or contract the chambers 150, 152 also can be used. Desirably, whatever arrangement is used to segregate the chambers 150, 152 from one another the volumetric ratio is such that the same amount of fluid flowing into both reservoirs can be accommodated. In other words, depending upon the stroke distance of the piston rod 102 of the damper, like displacements of the piston rods 102 result in like displacements of fluid into and out of the chamber 150, 152. The displaced fluid, coming from two separate dampers resulting from the same stroke of the piston rod 102 results in a substantially equal pressurization within the chambers 150, 152.

Functionally, the suspension system 80 illustrated in FIG. 5 is arranged to resist rolling of the vehicle body with which the suspension system is employed. In particular, damping forces against rolling are produced as working oil flows through the throttles 100 disposed within the passages 98 that extend through the pistons 96 of each of the dampers 82, 84, 86, 88. In addition, a damping force is produced as working oil flows through the throttle 122 disposed within the pressure regulator. This arrangement functions substantially identically to the arrangement described above with reference to FIG. 4.

When any one of the four dampers 82, 84, 86, 88 works in a direction that is different form that normally occurring during vehicle body rolling, a differential pressure is produced between the hydraulic routes located on the front wheel portion and the hydraulic routes located on the rear wheel portion. Due to the hydraulic differential pressure, working oil flows through the throttle 164 located between the first chamber 150 and the second chamber 152. The oil flow through this throttle 164 produces an additional damping force which helps stabilize the damping force that restricts rolling.

When the vehicle body pitches (i.e., moves about a generally transverse axis such as during rapid acceleration or deceleration) damping forces are produced by the throttles 100 disposed within the passages 98 that extend through the pistons 96 of each of the dampers 82, 84, 86, 88. Additionally, damping forces are provided by the throttle 122 provided within the pressure regulator 104. Similarly, when the vehicle bounces (i.e., all four dampers extend and contract substantially together) damping forces are produced almost solely by the throttles 100 disposed within the passages 98 of the pistons 96 of each of the dampers 82, 84, 86, 88. In addition, the pressurized gas contained within the third chamber 160 of the flow rate regulator 134 acts as a spring force to absorb energy during the compression of each of the dampers and returns energy during the extension.

It is anticipated that a throttle may also be provided at a position such as that indicated by the dashed circle A in FIG. 5. This location preferably is at a position generally in the middle of the second passage 132 between the pressure regulating oil chamber or the third chamber 110 of the pressure regulator 104 and the second chamber 152 of the flow rate regulator 134. Providing this throttle makes it possible to increase the damping force during both pitching and bouncing. In addition, because the throttle produces a damping force against vertical displacement of the front portion of the vehicle, it is possible to reduce the likelihood that damping forces are decreased by heavy weight that may be located over the forward portion of the vehicle and the front wheels.

It should be understood that the illustrated arrangement of FIG. 5 is an example in which two dampers on the front wheel portion are respectively connected to one another through a pressure regulator. It should be recognized, however, that the rear wheels can be connected to a pressure regulator while the front wheels are directly connected with the flow rate regulator 134 being interposed between the front wheels and the pressure regulator that links the rear wheels.

Figure 6:
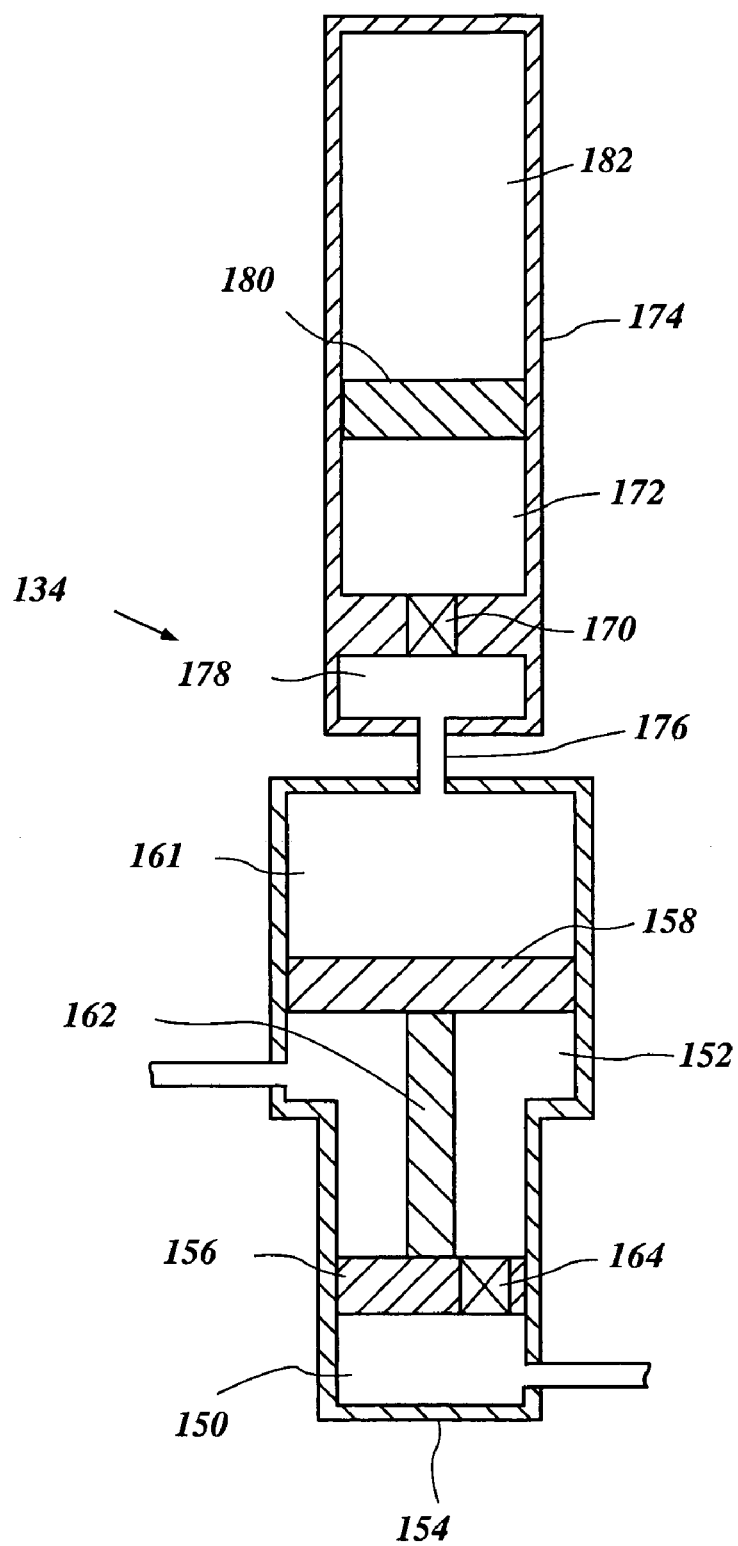
FIG. 6 is a pressure regulator used in a suspension system such as that illustrated in FIG. 5.

With reference now to FIG. 6, another construction of the flow rate regulator 134 is illustrated therein. This flow rate regulator of FIG. 6 can be used in the arrangements of FIGS. 4, 5, and any arrangement described below. With reference to FIG. 6, components that are the same as the arrangements illustrated in FIGS. 4 and 5 have been labeled with like reference numerals. Further description of these components is unnecessary for a complete understanding of this feature and aspect of the present invention.

It should be noted that the flow rate regulator 134 which is illustrated in FIG. 6 features a third oil or lubricant chamber 161 in place of the high pressure gas chamber that has been illustrated in FIG. 5. This chamber 161 communicated through a throttle 170 with a further chamber 172. This chamber 172 is defined within a subcylinder 174 in the illustrated arrangement.

The subcylinder 174 can be in fluid communication with the main cylinder 154 in any suitable manner. In the illustrated arrangement, a minor passage 176 extends between the cylinder 154 and the subcylinder 174. The minor passage 176 empties into a subchamber 178 which then opens into the chamber 172 through the throttle 170.

A movable partition or piston 180 is disposed within the subcylinder 174 to segregate the chamber 172 from a gas containing chamber 182. The gas chamber 182 preferably is filled with a high pressure inert gas. Of course, other high pressure gases or compressible fluids may also be used within this chamber 182. It should be appreciated that when the flow rate regulator 134 is arranged as in this illustrated embodiment, additional damping forces are provided by the throttle 170. Thus, working oil flows through the throttle 170 of the subcylinder 174 when the pistons 156, 158 move. Such movement typically would occur when the vehicle bounces. Thus, an additional damping force provided by the throttle 170 can be produced to restrict bouncing if so desired.

Figure 7:
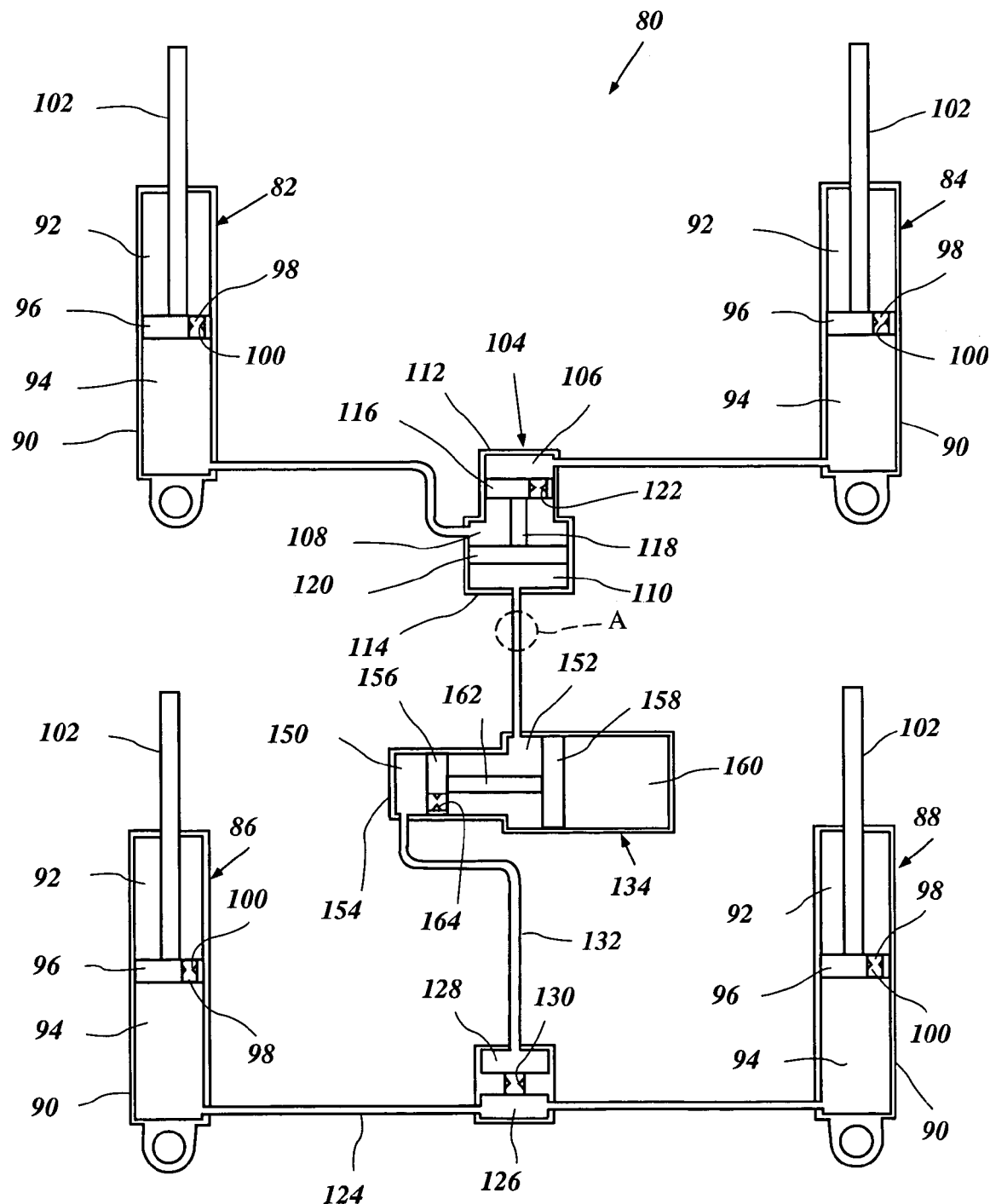
FIG. 7 is a further arrangement of a suspension system arranged and configured in accordance with certain features, aspects and advantages of the present invention.

With reference now to FIG. 7, a further arrangement of the suspension system 80 arranged and configured in accordance with certain features, aspects, and advantages of the present invention will be described. Generally speaking, the arrangement of FIG. 7 is very similar to the arrangements of FIGS. 4 and 5 combined. In other words, the arrangement of FIG. 7 features the subchambers 128 and 126 as well as the throttle 130 of FIG. 4. The features of the flow regulator 134 generally are the same as the arrangement illustrated in FIG. 5.

Functionally, a damping force is produced as working oil flows through the throttle 130. This flow through the throttle 130 generally occurs as the vehicle pitches or bounces. In addition, using the throttle valve 130 allows an increase in the damping forces produced by the dampers 86, 88 regardless of the loading on the rear portion of the vehicle. In other words, the damping force is not decreased as a result of heavy loading on the rear portion of the vehicle such as when a heavy load is placed within a bed of a pickup on the back in the trunk of an automobile. In addition, as described above, the throttle can be positioned in the location indicated by the dashed circle A by positioning a throttle in this location such that additional damping can be provided for the front portion of the vehicle. In addition, the flow rate regulator 134 can comprise the illustrated arrangement or any of the other arrangements illustrated herein. Furthermore, as discussed above, the system can be reversed such that the front wheel portion is interconnected with the throttle 130 while the rear wheel portion is interconnected using the pressure regulator 104.

Figure 8:
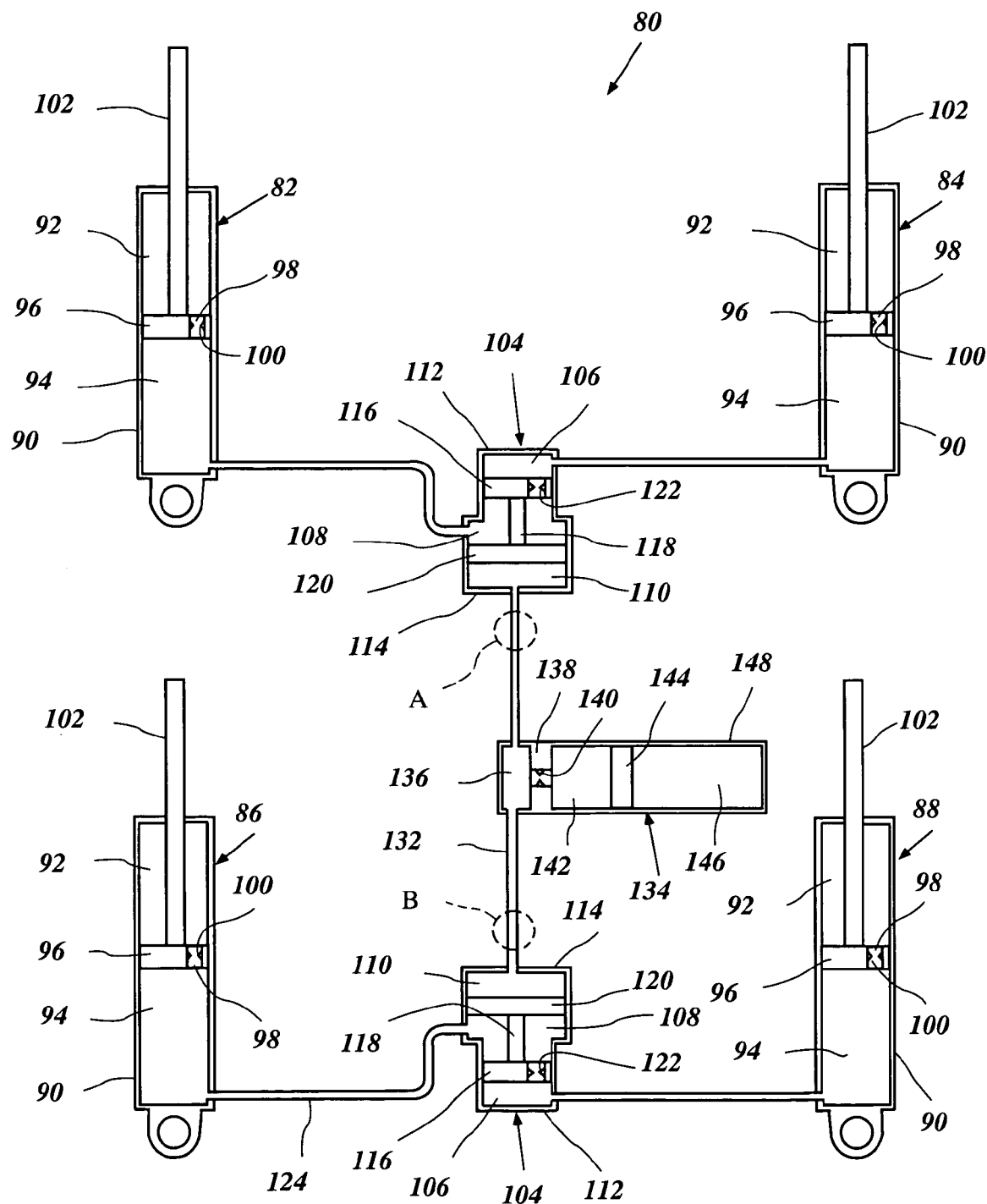
FIG. 8 is another arrangement of a suspension system arranged and configured in accordance with certain features, aspects, and advantages of the present invention.

With reference now to FIG. 8, a further suspension system 80 arranged and configured in accordance with certain features, aspects, and advantages of the present invention will be described. Similar to the suspension system described above, several components of the arrangement of FIG. 8 are substantially identical to the arrangements described above. In the arrangement illustrated in FIG. 8, a pair of pressure regulators 104 are used to connect the dampers 82, 84 of the front portion and the dampers 86, 88 of the rear portion respectively. A flow rate regulator 134 is interposed between the pressure regulators. These components all have been described above. Accordingly, like reference numerals refer to like components and further description of these components is deemed unnecessary unless otherwise described below.

Functionally, when a vehicle body provided with the vehicle suspension system 80 illustrated in FIG. 8 rolls, damping forces are produced as working oil flows through the throttles 100 that are positioned within the passages 98 formed in the pistons 96 of each of the dampers 82, 84, 86, 88. In addition, damping forces are produced as working oil flows through the throttles 122 of both of the pressure regulators.

When one of the four hydraulic cylinders or dampers reacts differently from the reaction normally occurred during rolling, the oil flow rate through the throttle in the respective pressure regulator 104 decreases. Due to the pressure decrease, the pistons move within the pressure regulator and the volume of the third chamber 110 of the respective pressure regulator changes. Accordingly, the volumetric change in this chamber is accommodated by the flow of working oil to or from the flow rate regulator 134. This flow of working oil from the flow rate regulator 134 occurs regardless of which of the four dampers 82, 84, 86, 88 is reacting differently than that which is expected during rolling movement of the vehicle. Thus, the damping force produced by the first or second pressure regulator 104 decreases while the vehicle negotiates an irregular road surface while the vehicle is rolling. However, an augmenting increase in damping force is produced by the flow rate regulator 134. Accordingly, the damping forces tending to restrict the rolling motion of the vehicle are stabilized through the use of the flow rate regulator 134 in combination with the other features, aspects, and advantages of the suspension systems 80 illustrated in FIG. 8.

With continued reference to FIG. 8, when a vehicle equipped with a suspension system 80 illustrated in FIG. 8 pitches, or moves about transversely extending axis, damping generally is produced only by the throttles 100 positioned within the passage 98 formed in the pistons 96 of each of the dampers 82, 84, 86, 88. Of course, some degree of damping also inures from the use of the throttle 140 within the flow rate regulator 134. This increase in damping force helps reduce pitching of the vehicle. Furthermore, when the vehicle bounces, the pressure of the high pressure gas contained within the chamber 146 can act as a spring force in restoring the dampers to a predetermined position.

As described above, throttle valves can be positioned at either location A or location B or at both of these locations. The throttle valves also can augment the damping forces provided through the system 80 in the illustrated arrangement. The position A preferably is in the middle of the second communication passage 132 desirably is located between the pressure regulating chamber, or third chamber 110, and the flow rate regulator 134. Additionally, the position B preferably is in the middle of the second communication passage 132 at a location generally between the flow rate regulator 134 and the third chamber 110. As will be recognized, providing a throttle in the position A makes it possible to produce a damping force that restricts the vertical movement of the front portion of the vehicle and augments the damping forces during loading of the front portion of the vehicle. Similarly, by providing a throttle at the location B, it is possible to augment the damping forces against vertical movement of the rear portion of the vehicle and to reduce the likelihood that the damping force is adversely effected when the rear of the vehicle is loaded with increasing weight.

With continued reference to FIG. 8, another feature of this arrangement is that the first and second pressure regulators 104 can work independently of each other. Therefore, even if the dampers 82, 84 associated with the front wheels behave in a manner associated with the left turn and the hydraulic dampers 86, 88 associated with the rear wheels behave in a manner associated with a right turn, the damping forces still will be produced. Moreover, it is possible to individually set the damping force characteristics of the throttles within the pressure regulators such that the damping force characteristics can be tuned to the particular application or vehicle with which the suspension system 80 is being used. Thus, a stiffer rear end can be set up for a load carrying vehicle, for instance.

Figure 9:
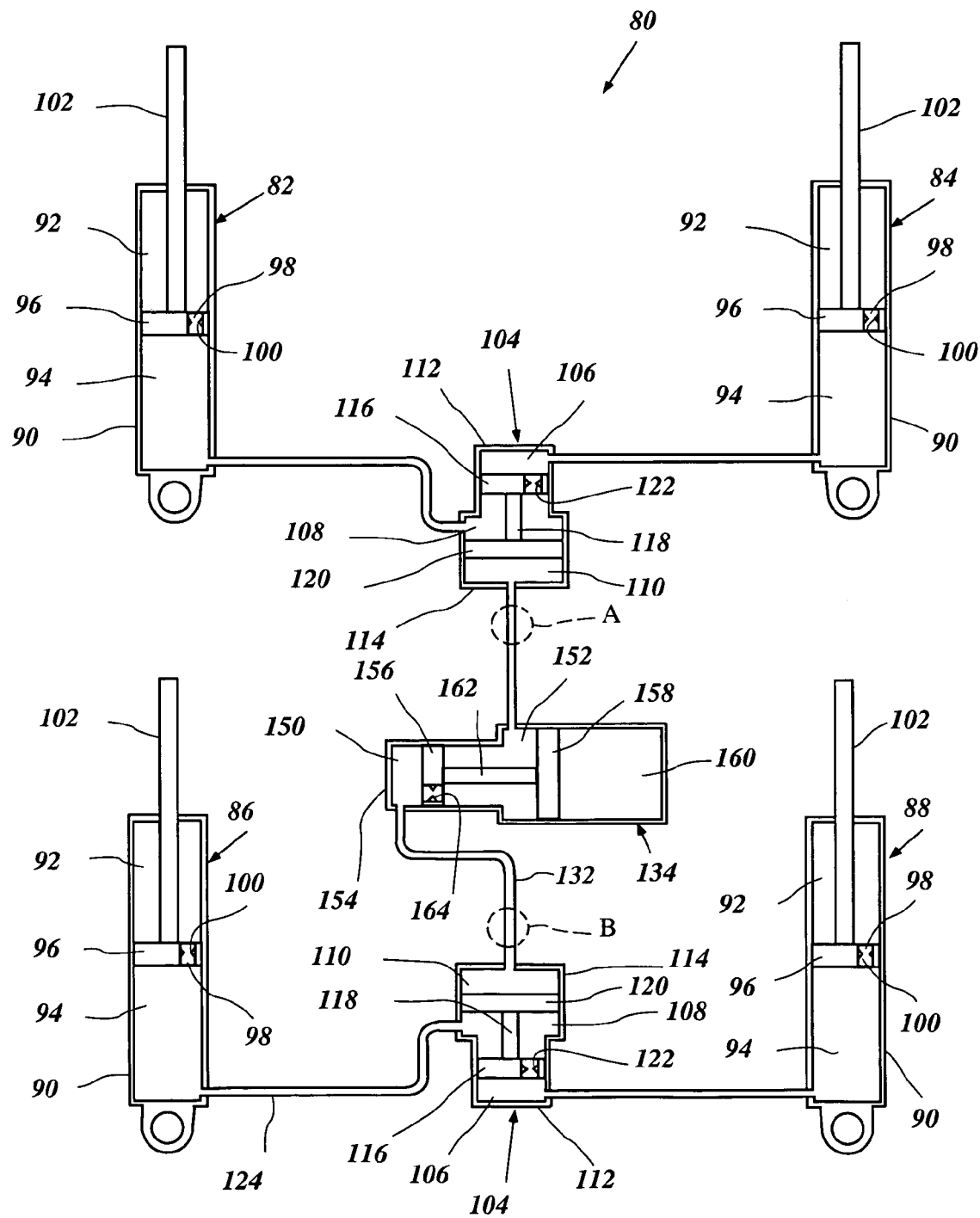
FIG. 9 is another arrangement of a suspension system arranged and configured in accordance with certain features, aspects, and advantages of the present invention.
Figure 10:
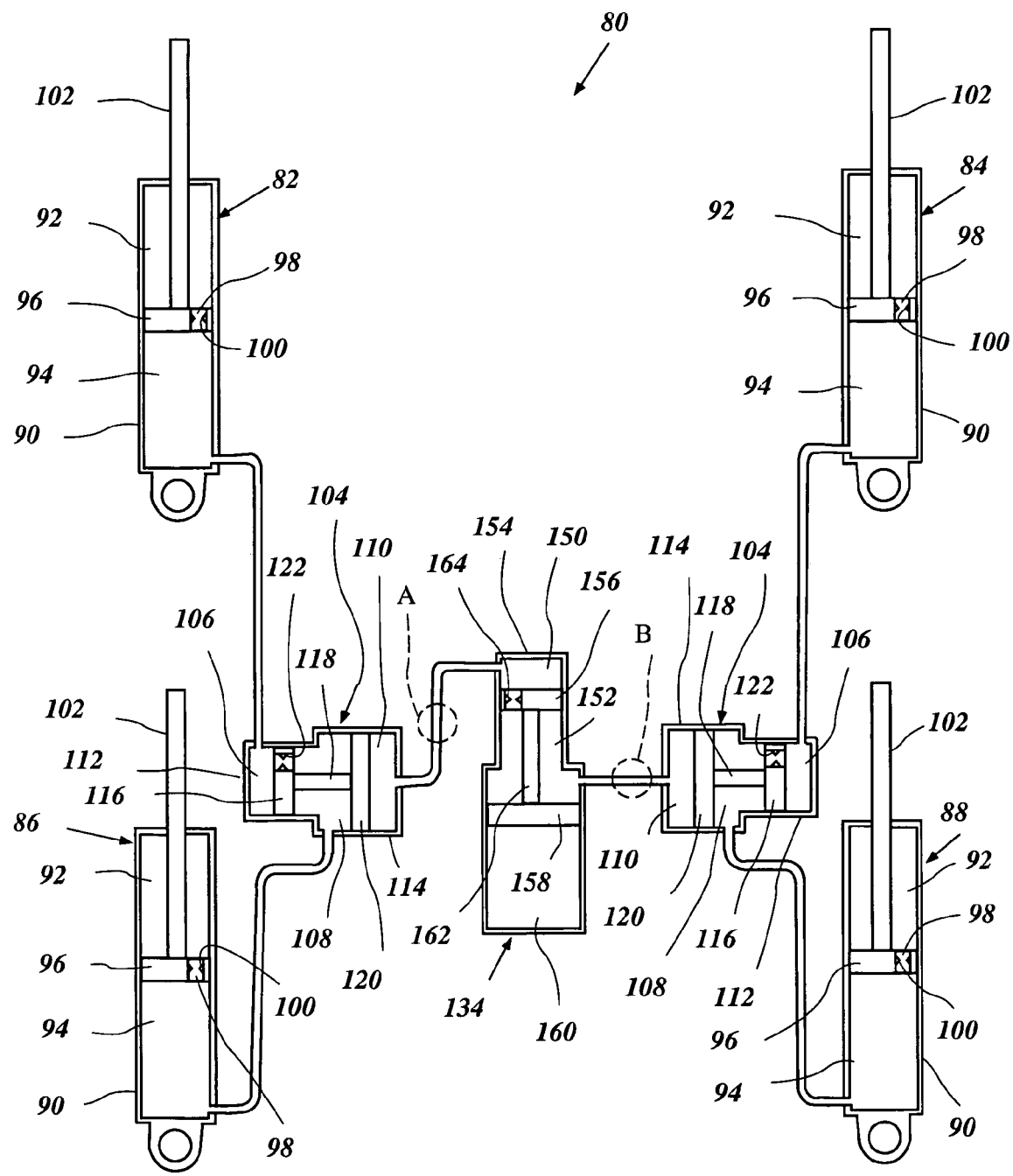
FIG. 10 is another arrangement of a suspension system arranged and configured in accordance with certain features, aspects, and advantages of the present invention.
Figure 11:
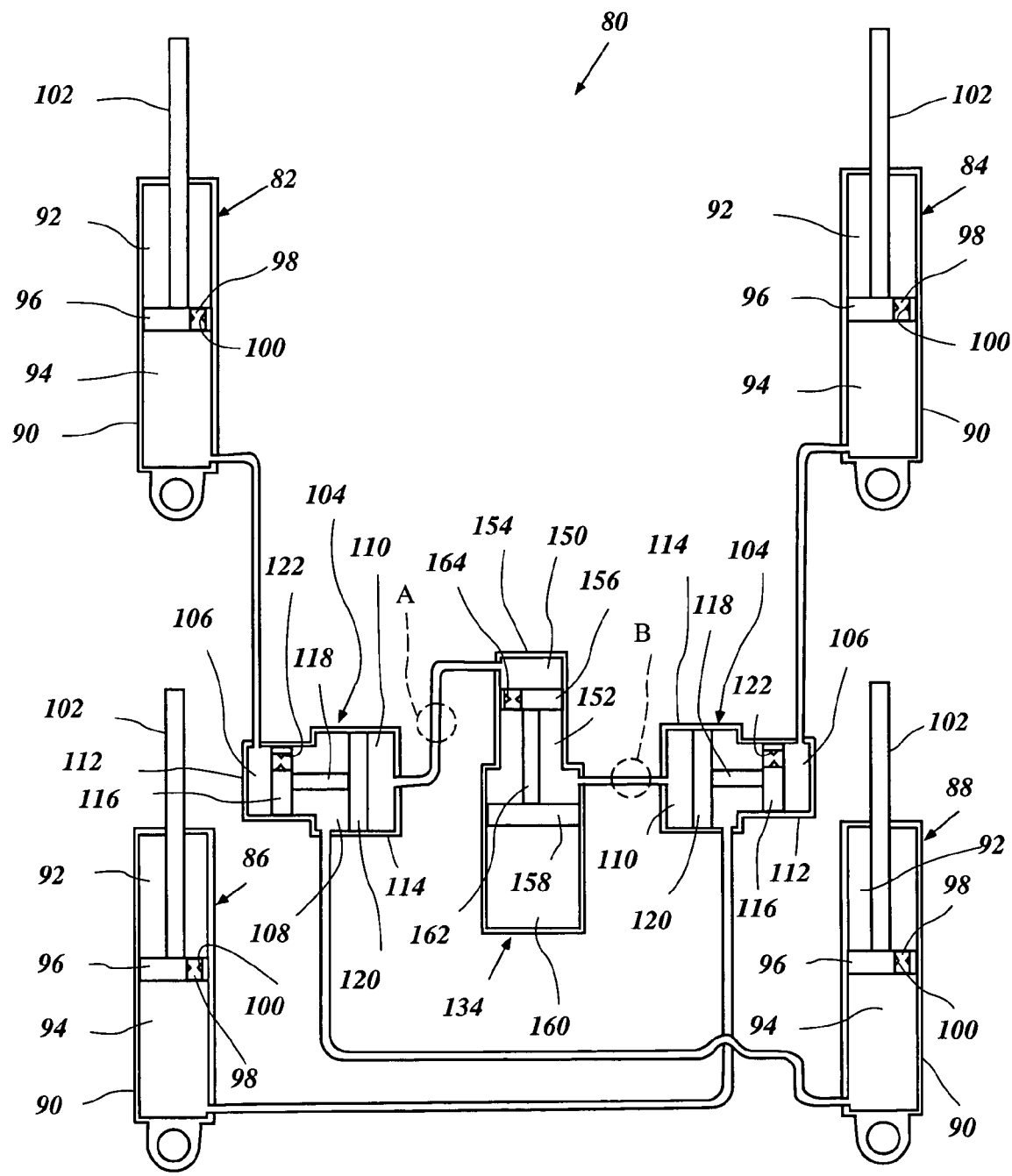
FIG. 11 is another arrangement of a suspension system arranged and configured in accordance with certain features, aspects, and advantages of the present invention.

With reference now to FIGS. 9, 10, and 11, three additional arrangements of suspension systems configured and arranged in accordance with certain features, aspects, and advantages of the present invention are illustrated therein. These arrangements are variations upon the general themes illustrated in FIGS. 4–8 above. In general, FIG. 9 is a variation of the arrangement of FIG. 8 in which the flow rate regulator 134 illustrated in FIG. 5 has been placed in the position of the flow rate regulator 134 as illustrated in FIG. 8. The functional characteristics of this arrangement will be described below.

In addition, with reference now to FIG. 10, an arrangement similar to that illustrated in FIG. 9 is illustrated. In this arrangement, however, the interrelated pairs of cylinders or dampers are arranged along the vehicular side. In other words, the dampers 82, 86 that are positioned along the left side of the vehicle are interrelated through the first pressure regulator 104 while the dampers 84, 88 which are associated with the right side of the vehicle are interrelated through a second pressure regulator 104. The pressure regulators are connected together through a flow rate regulator 134 such as that disclosed and described in the context of FIG. 5. The functional operation of the arrangement of FIG. 10 will also be described in more detail below.

With reference to FIG. 11, an arrangement similar to that of FIGS. 9 and 10 is illustrated therein. However, in the arrangement illustrated in FIG. 11, a cross-interrelationship is provided. In other words, two dampers 82, 88 (i.e., the left front damper and right rear damper) are interrelated through a single pressure regulator 104 while the left rear damper 86 and the right front damper 84 are interrelated through a second pressure regulator 104. The pressure regulators again are interrelated through a flow rate regulator 134. In the illustrated arrangement, the flow rate regulator 134 is similar to that described in the context of the arrangement of FIG. 5.

It is anticipated that any of the above descriptions can be arranged or rearranged in accordance with any of the other arrangements illustrated herein. Furthermore, one of ordinary skill in the art will readily appreciate the interrelationship of the cylinders and the functional effects such interrelationships may have in view of the description of the above arrangements and the effects on the functionality of those arrangements.

In the arrangement of FIG. 9, when the vehicle body associated with the suspension system 80 goes through a rolling movement (i.e., movement about a longitudinally extending axis) damping forces are produced as working oil flows through the throttles 100 provided in the passages 98 of the pistons 96. Additional damping forces are provided as the working oil flows through the throttles 122 disposed within the pistons 116 of the pressure regulators 104. When one of the four wheels, for example, the front left wheel, moves in a manner not expected during vehicle rolling, the working oil flow rate through the throttle 122 in the associated pressure regulator 104 decreases. In other words, the damping force decreases within the front portion of the suspension system 80. Due to the decrease in the oil flow rate through the throttle 122, the pressure drops within both of the chambers 106, 108. Accordingly, the pistons move to increase the volume within the third chamber 110. As the volume of the chamber 110 increases, working oil must be provided from the flow rate regulator 134. At the same time, the rear wheels which are reacting in accordance with standard rolling movement (i.e., one cylinder extending while the other is contracting) the pistons 116, 120 do not move and the volume of the chamber 110 remains substantially constant. Accordingly, a damping force is produced as working oil flows through the throttle passage 164 in the piston 156 through the flow rate regulator 134. This damping force augments the damping force of the suspension system 80 and compensates for the decrease of the damping force caused by the decrease in flow through the throttle 122 of the pressure regulator 104. As would be expected, a similar phenomenon occurs when one of the hydraulic cylinders for the rear wheels moves in a direction different from that expected during vehicle rolling movement.

Accordingly, when the vehicle having a suspension system arranged and configured in accordance with certain features, aspects, and advantages of the present invention such as that illustrated in FIG. 9 negotiates an irregular road surface during rolling movement (i.e., during turning), a damping force produced within the flow rate regulator 134 compensates for a reduction in the damping force provided within the pressure regulator 104. The augmented damping force, therefore, helps to restrict rolling movement of the vehicle and helps provide a more stable turning vehicle regardless of the irregularities of the road surface.

The system 80 illustrated in FIG. 9 also advantageously augments the damping forces during pitching of the vehicle. This arises at least in part because damping is provided through the throttles 100 provided in each of the dampers 82, 84, 86, 88 as well as the throttle 164 disposed within the flow rate regulator 134. Of course, when the vehicle bounces, the damping forces are produced almost solely by the throttles 100 provided within the dampers 82, 84, 86, 88. Moreover, during bouncing, the pressure of the high pressure gas within the flow rate regulator 134 functions as a returning spring force.

When arrangements such as that illustrated in FIG. 9 are employed, the first and second pressure regulators 104 operate substantially independently. Accordingly, damping forces are produced even when the two hydraulic dampers 82, 84 operate as if they are in a right turn while the two hydraulic dampers 86, 88 for the rear wheels work as though in a left turn. Moreover, the throttle 122 of the first pressure regulator 104 may be set to have different damping characteristics from that of the throttle 122 of the second pressure regulator. Accordingly, different damping characteristics can be arranged from the front of the vehicle to the rear of the vehicle.

Moreover, and as described above, additional throttles may be provided along the suspension system 80. For example, in the illustrated arrangement, additional throttles can be positioned at A, at B, or at A and B. The position of A preferably is between the pressure regulator 104 associated with the front wheels and the flow rate regulator 134. Similarly, the arrangement of the throttle B preferably is between the pressure regulator 104 associated with the rear wheels and the flow rate regulator 134. By providing the throttles in these particular locations, the damping forces during pitching or bouncing can be increased. In particular, by providing a throttle at the position A, an increased damping force can be experienced when the vehicle has vertical movement of a forward portion of the vehicle. In addition, providing a throttle at the location A can augment the damping forces even though increased weight is placed on a front portion of the vehicle. Similar results also inure from placing a throttle at location B with respect to the rear portion of the vehicle.

With reference now to FIGS. 10 and 11, two additional arrangements are illustrated therein. In these arrangements, differing sets of wheels are interrelated. However, as will be expected, the augmentation of damping forces results in a similar manner. That is, in the arrangement of FIG. 10, the damping forces are augmented during pitching and rolling of the vehicle. Similarly, in the arrangement of FIG. 11, the damping forces are augmented during twisting movement of the vehicle. In view of the above description of the arrangements of FIGS. 4–9, further description of the arrangements of FIG. 10 and 11 is unnecessary. While the arrangements of FIGS. 10 and 11 are distinct from the arrangements described above, the principles at work within this arrangement are similar to those described above.

Figure 12:
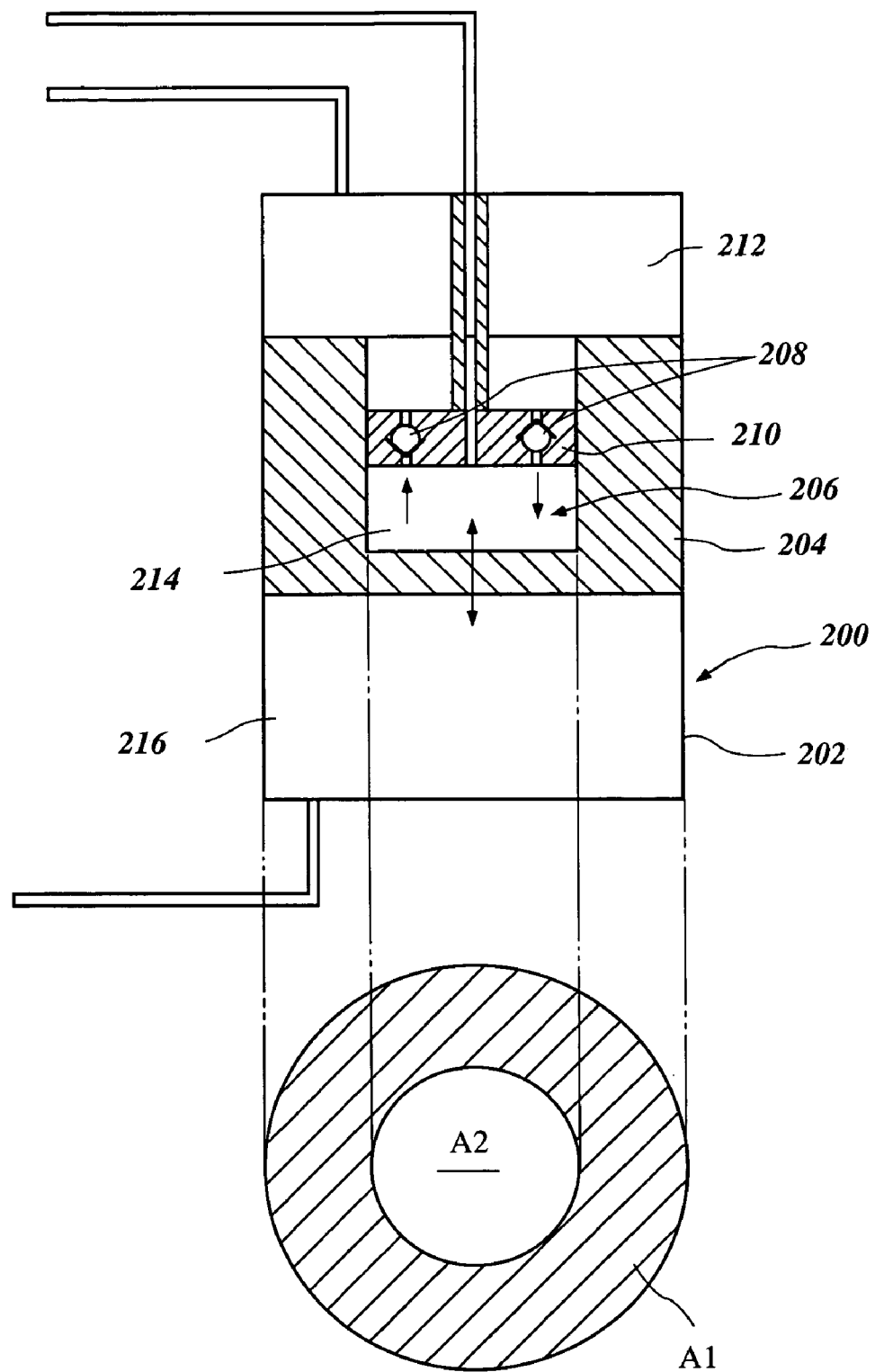
FIG. 12 is a flow regulator arranged and configured in accordance with certain features, aspects, and advantages of the present invention.

With reference now to FIG. 12, a pressure regulator construction is illustrated therein. In the illustrated arrangement, pressure regulator 200 generally comprises a first pressure regulating cylinder 202 with a movable wall 204 inside of which is formed a second pressure regulating cylinder 206. A throttle 208 is formed in a wall 210 of the second pressure regulating cylinder 206. A first oil chamber 212, a second oil chamber 214, and a pressure regulating oil chamber 216 are defined by the cylinders 202, 206.

In the illustrated arrangement, the first pressure regulating cylinder 202 has an effective cross-sectional area A1 while the second pressure regulating cylinder 206 has a second effective cross-sectional area A2.

As will be appreciated, the first oil chamber 212 and the pressure regulating oil chamber 216 are separated by the movable wall or piston 204 in which the wall 210 is slidably disposed. Generally speaking, as lubricant or working flows into the pressure regulating cylinder 206 and more particularly into the second oil chamber 214, the movable wall 204 moves up and down within the illustrated pressure regulator. This movement of course causes a transfer of working oil from the pressure regulating oil chamber 216 and thus the pressure regulator 200 illustrated in FIG. 12 can be implemented in the place of the pressure regulators 104 of any of the illustrated arrangements.

Of course, although the present invention has been described in terms of several preferred embodiments, other construction also are possible. For instance, it is understood that each damper can be formed by two or more chambers which are not necessarily disposed on opposite sides of the piston, as was the case in the embodiments illustrated and described above (see chambers 32, 34 and piston 36). In one possible mode, one or more of the dampers can include a two or more bores in which pistons slide. The pistons are part of a piston device of the damper, but they need not be linked together. Each piston and bore define a variable-volume chamber which expands and contracts in volume when the corresponding piston moves. The opposite side of each piston can be open to the air. The variable volume chambers of the damper are connected so that fluid from one chamber passes to the other chamber when at least one of the pistons is slid. The flow from one chamber to the other may be throttled, as described above. Accordingly, this type of damper construction also can be used with the present suspension system.

In addition, several features of the disclosed arrangements can be used in other arrangements and various features, aspects and advantages can be interchanged as desired between or among all of the disclosed embodiments. Accordingly, although the present invention has been described in terms of certain arrangements, other arrangements apparent to those of ordinary skill in the art also are within the scope of this invention. Thus, various changes and modifications can be made without departing from the spirit and scope of the invention. Moreover, not all features, aspects and advantages are necessarily required to practice the present invention. The scope of the present invention is intended to be defined only by a fair reading of the claims that follow.

What is claimed is:

1. A suspension system for a four wheeled vehicle, said suspension system comprising a first damper, a second damper, a third damper and a fourth damper, each of said dampers comprising a cylinder body and a piston arranged to reciprocate within said damper, each piston dividing an interior of each cylinder body into an upper chamber and a lower chamber, each piston also comprising a connecting passage that places said upper chamber and said lower chamber in fluid communication, said lower chamber of said first damper and said lower chamber of said second damper being interconnected with a pressure regulator, said first pressure regulator comprising a first pressure regulating chamber and a second pressure regulating chamber, a first movable wall defining at least a portion of said first pressure regulating chamber and a second movable wall defining at least a portion of said second pressure regulating chamber, said lower chamber of said first damper being connected to said first pressure regulating chamber and said lower chamber of said second damper being connected to said second pressure regulating chamber, a passage extending between said first pressure regulating chamber and said second pressure regulating chamber, said pressure regulator further comprising a third pressure regulating chamber, said third pressure regulating chamber being fluidically connected with a flow rate regulator which fluidically communicates with a second pressure regulator through at least a first conduit, said flow rate regulator being disposed along said first conduit and being fluid communication with said first conduit, said flow rate regulator containing a first flow regulating chamber and a second flow regulating chamber, and said first flow regulating chamber and second flow regulating chamber fluidically communicating through a first throttled passage.

2. The suspension system of claim 1, wherein said third damper and said fourth damper are interrelated through a second pressure regulator and said second pressure regulator defines a connection between said third damper and said fourth damper and said third pressure regulating chamber.

3. The suspension system of claim 1, wherein said first damper is a front left damper and said second damper is a front right damper.

4. The suspension system of claim 1, wherein said first damper is a front left damper and said second damper is a rear left damper.

5. The suspension system of claim 1, wherein said first damper is a front left damper and said second damper is a rear right damper.

6. The suspension system of claim 1, wherein said flow rate regulator comprises a third flow regulating chamber and said first flow regulating chamber and said second flow regulating chamber are segregated from each other by a first movable partition and said first flow regulating chamber and said first conduit communicate through a throttled passage extending through said first movable partition.

7. The suspension system of claim 6, wherein said first conduit, said flow rate regulator and a second conduit form a passageway between said third damper, said fourth damper and said second pressure regulator.

8. The suspension system of claim 6, further comprising a throttle disposed along said first conduit.

9. The suspension system of claim 8, wherein said throttle is positioned at a juncture being fluid lines extending from said third damper and said fourth damper.

10. The suspension system of claim 1, wherein said third pressure regulating chamber is separated from said second flow regulating chamber by a second movable partition.

11. The suspension system of claim 10, wherein said flow regulator further comprises a sub-cylinder, said sub-cylinder being in fluid communication with said third pressure regulating chamber and said sub-cylinder comprising at least one movable partition.

12. The suspension system of claim 11, further comprising a throttled passage connecting said sub-cylinder and said third pressure regulating chamber.

13. The suspension system of claim 1, wherein said first movable wall and said second movable wall are connected such that said first movable wall and said second movable wall move synchronously.

14. The suspension system of claim 1, wherein said first movable wall contains a recess and said second movable wall is disposed within said recess.

15. The suspension system of claim 1, wherein said first flow regulating chamber and said second flow regulating chamber are integrally formed in a single component.

16. The suspension system of claim 1, wherein said throttled passage is positioned along said first conduit between said flow rate regulator and said first pressure regulator.

17. A suspension system for a wheeled vehicle, said suspension system comprising a first damper, a second damper and a fourth damper, each of said dampers comprising a piston device arranged to a act upon fluid within at least two fluid chambers, each of the fluid chambers being in fluidic communication with each other, at least one of the chambers of the first damper and at least one of the chambers of the second damper being interconnected with a first pressure regulator, said first pressure regulator including a first pressure regulating chamber and a second pressure regulating chamber, a first movable wall defining at least a portion of said first pressure regulating chamber and a second movable wall defining at least a portion of said second pressure regulating chamber, said at least one chamber of said first damper being connected to said first pressure regulating chamber and said at least one chamber of said second damper being connected to said second pressure regulating chamber, a passage extending between said first pressure regulating chamber and said second pressure regulating chamber, said first pressure regulator further comprising a third pressure regulating chamber, said third pressure regulating chamber being connected with a flow rate regulator which fluidically communicates with a second pressure regulator through at least a first conduit, said flow rate regulator being disposed along said first conduit and being in fluid communication with said first conduit, said flow rate regulator containing a first flow regulating chamber and a second flow regulating chamber, and said first flow regulating chamber and said first conduit communicating through a throttled passage.

18. The suspension system of claim 17, wherein said third damper and said fourth damper are interrelated through said second pressure regulator and said second pressure regulator defines a connection between said third damper and said fourth damper and said third pressure regulating chamber.

19. The suspension system of claim 17, wherein said flow rate regulator comprises a third flow regulating chamber and said first flow regulating chamber and said second flow regulating chamber are segregated from each other by a first movable partition and said first flow regulating chamber and said first conduit communicate through a throttled passage extending through said first movable partition and said flow regulator and said second pressure regulator are connected by a second conduit.

20. The suspension system of claim 19, wherein said first conduit, said flow rate regulator and said second conduit form a passageway between said third damper, said fourth damper and said first pressure regulator.

21. The suspension system of claim 19, wherein said flow rate regulator further comprises a third pressure regulating chamber, said third pressure regulating chamber being separated from said second pressure regulating chamber by a second movable partition.

22. The suspension system of claim 21, wherein said flow regulator further comprises a sub-cylinder, said sub-cylinder being in fluid communication with said third pressure regulating chamber and said sub-cylinder comprising at least one movable partition.

23. The suspension system of claim 22, further comprising a throttled passage connecting said sub-cylinder and said third pressure regulating chamber.

24. The suspension system of claim 17, wherein said throttled passage is disposed along said first conduit, comprising a throttle positioned at a juncture between fluid lines extending from said third damper and said fourth damper.

25. The suspension system of claim 17, wherein said first movable wall and said second movable wall are connected such that said first movable wall and said second movable wall move synchronously.

26. The suspension system of claim 17, wherein said first movable wall contains a recess and said second movable wall is disposed within said recess.

* * * * *

UNITED STATES PATENT AND TRADEMARK OFFICE
CERTIFICATE OF CORRECTION

PATENT NO. : 7,131,654 B2
APPLICATION NO. : 10/979511
DATED : November 7, 2006
INVENTOR(S) : Kouji Sakai It is certified that error appears in the above-identified patent and that said Letters Patent is hereby corrected as shown below:

Title Page; item (73);

On First Page, Col. 1 (Assignee's Name), Line 1, please delete "Hatsuboki" and insert -- Hatsudoki --, therefor.

In Col. 16, Line 52, in Claim 1, before "pressure", please insert -- first --.

In Col. 16, Line 63, in Claim 1, after "said", please insert -- first --.

In Col. 17, Line 2, in Claim 1, after "being", insert -- in --.

In Col. 17, Line 5, in Claim 1, before "second", please insert -- said --.

In Col. 17, Line 9, in Claim 2, after "through", please delete "a" and insert -- said --, therefor.

In Col. 17, Line 60 (Approx.), in Claim 17, before "wheeled", please insert -- four --.

In Col. 17, Line 62 (Approx.), in Claim 17, before "and", please insert -- , a third damper --.

UNITED STATES PATENT AND TRADEMARK OFFICE
CERTIFICATE OF CORRECTION

| | | |
|---|---|---|
| PATENT NO. | : 7,131,654 B2 | Page 2 of 2 |
| APPLICATION NO. | : 10/979511 | |
| DATED | : November 7, 2006 | |
| INVENTOR(S) | : Kouji Sakai | |

It is certified that error appears in the above-identified patent and that said Letters Patent is hereby corrected as shown below:

In Col. 17, Line 63, in Claim 17, after "arranged to", please delete "a".

Signed and Sealed this

Twenty-sixth Day of August, 2008

JON W. DUDAS
*Director of the United States Patent and Trademark Office*